(12) United States Patent
Kim

(10) Patent No.: US 7,692,722 B2
(45) Date of Patent: Apr. 6, 2010

(54) CAPTION SERVICE MENU DISPLAY APPARATUS AND METHOD

(75) Inventor: Kwang-won Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1015 days.

(21) Appl. No.: 11/269,550

(22) Filed: Nov. 9, 2005

(65) Prior Publication Data

US 2006/0158551 A1 Jul. 20, 2006

(30) Foreign Application Priority Data

Dec. 27, 2004 (KR) ...................... 10-2004-0112891

(51) Int. Cl.
*H04N 7/00* (2006.01)
(52) U.S. Cl. .................................. 348/468
(58) Field of Classification Search ................ 348/468, 348/589, 563–569, 461, 478, 476, 465, 467, 348/600
See application file for complete search history.

(56) References Cited

U.S. PATENT DOCUMENTS

| | | | | |
|---|---|---|---|---|
| 5,576,768 A | * | 11/1996 | Gomikawa | .................. 348/468 |
| 6,130,722 A | * | 10/2000 | Bae et al. | ..................... 348/589 |
| 6,320,621 B1 | * | 11/2001 | Fu | ............................... 348/465 |
| 6,373,526 B1 | | 4/2002 | Kessler et al. | |
| 6,507,369 B1 | * | 1/2003 | Kim | ............................ 348/465 |
| 7,050,109 B2 | * | 5/2006 | Safadi et al. | ................. 348/468 |
| 7,349,429 B2 | * | 3/2008 | Lee et al. | ..................... 370/466 |
| 7,430,016 B2 | * | 9/2008 | Park | ............................. 348/468 |
| 2002/0122136 A1 | | 9/2002 | Safadi et al. | |
| 2007/0076122 A1 | * | 4/2007 | Modi et al. | .................. 348/465 |

FOREIGN PATENT DOCUMENTS

| | | |
|---|---|---|
| CN | 1890967 A2 | 1/2007 |
| JP | 2003-18490 A | 1/2003 |
| KR | 2001-0036876 A | 5/2001 |
| KR | 10-2004-0078765 A | 9/2004 |
| WO | 2005/057920 A1 | 6/2005 |

\* cited by examiner

*Primary Examiner*—Paulos M Natnael
(74) *Attorney, Agent, or Firm*—Sughrue Mion, PLLC

(57) ABSTRACT

A caption service menu display apparatus and method. When a different caption delivery system is adopted for a digital stream, the caption menu is classified into an EIA 608 menu and an EIA 708 menu. Regardless of the caption transmission medium, the caption service menu is displayed based on the caption delivery system of the actual stream.

25 Claims, 3 Drawing Sheets

CAPTION SERVICE MENU DISPLAY APPARATUS AND METHOD

CROSS-REFERENCE TO RELATED APPLICATIONS

This application claims the benefit under 35 U.S.C. § 119(a) from Korean Patent Application No. 2004-112891 filed on Dec. 27, 2004 in the Korean Intellectual Property Office, the entire disclosure of which is incorporated herein by reference.

BACKGROUND OF THE INVENTION

1. Field of the Invention

The present invention relates generally to a caption display apparatus and method thereof. More specifically, the present invention relates to an apparatus and method for displaying a different caption service menu depending on a type of a caption service input from a digital receiver.

2. Description of the Related Art

Recently, most broadcast content provided to TVs include a caption. There are two classes of captions: an open caption and a closed caption. An open caption is a subtitle and is displayed on a TV screen upon transmission from a broadcast station, and the viewer does not have the option of turning-off an open caption. A closed caption is a hidden caption and is displayed on a TV screen only when the TV has a caption receive function. For example, an open caption is an onscreen description of information such as staff profile, song title, singer, Civil Defense training notice, and Korean subtitle for rental videos, which is displayed to the viewer regardless of the viewer's intention. On the other hand, a closed caption is available to a viewer who wants to obtain dialogue or additional information associated with a program. Especially, the closed captioning function can display dialogue of a television program or subtitles of a video on the screen to aid a language study or hearing-impaired people.

Caption broadcasting has conformed to a TV broadcast transmission of the National Television Standards Committee (NTSC) but various transmission systems have been adopted with the advent of digital TVs.

The caption services are provided through diverse transmission media such as terrestrial broadcasting or cable satellites, and the provided caption services are different from each other. While the Electronic Industries Association (EIA) 608 caption has been provided only to NTSC TVs, the digital broadcasting also transmits the EIA 608 caption. Accordingly, it is required to separate a caption service menu for each channel.

Caption data for a digital TV is contained and delivered in a user data region of a bit stream.

The user data region consists of a channel carrying NTSC caption data in line 21 of an NTSC signal or Digital Television Closed-Captioning (DTVCC) caption data. The NTSC caption data conforms to the EIA 608 standard, and the DTVCC caption data conforms to the EIA 708 standard.

The EIA 708 caption service alone is not always input as an input data stream of a digital caption data processing system in a specific broadcast, but the EIA 608 caption service may be provided. For example, in cable and satellite digital broadcasting, only the EIA 708 caption data can be input, or both the EIA 708 caption data CC1, CC2, . . . , Service 1, Service 2, . . . and the EIA 608 caption data CC1, CC2, CC2 and CC4 can be input together.

In the above situation, the digital caption service system displays an EIA 708 caption service menu as shown in FIG. 2A when a user selects the caption service menu.

Since the digital caption data processing system displays the caption service menu relating to the EIA 708 in FIG. 2A without regard to whether the input caption is the EIA 708 caption or the EIA 608 caption, the user cannot correctly learn which caption service is provided.

In view of the related art, a need arises to display a caption service menu discriminated for a user's convenience even when the EIA 708 caption or the EIA 608 is input.

SUMMARY OF THE INVENTION

The present invention has been provided to address the above-mentioned and other problems and disadvantages occurring in the conventional arrangement, and an aspect of the present invention provides a caption display apparatus and a caption display method for displaying a caption service menu classified by analyzing a data format transmitted in a user data region of a Moving Picture Experts Group (MPEG) picture of a digital stream being input through each channel.

To achieve the above aspect and/or feature of the present invention, a method for displaying a caption service menu includes displaying a different caption service menu according to a caption delivery system of a received channel.

The caption delivery system may be determined according to a format of data carried in a user data region of a Moving Picture Experts Group (MPEG) picture of a digital stream. The caption delivery system may be an Electronic Industries Association (EIA) 708 caption delivery system and/or an EIA 608 caption delivery system.

An EIA 708 caption service menu is displayed when the delivery system is the EIA 708 caption delivery system, and an EIA 608 caption service menu is displayed when the delivery system is the EIA 608 caption delivery system.

The EIA 708 caption service menu is displayed when the delivery system is both the EIA 708 caption delivery system and the EIA 608 caption delivery system. One of the EIA 708 caption service menu and the EIA 608 caption service menu may be selected and displayed when the delivery system is both the EIA 708 caption delivery system and the EIA 608 caption delivery system.

Consistent with the above aspect of the present invention, a caption service menu display apparatus includes a caption processor for outputting caption information to display a different caption service menu according to a caption delivery system of a received channel. The caption delivery system is determined according to a format of data carried in a user data region of a Moving Picture Experts Group (MPEG) picture of a digital stream.

The caption delivery system may be an Electronic Industries Association (EIA) 708 caption delivery system or an EIA 608 caption delivery system. An EIA 708 caption service menu is displayed when the delivery system is the EIA 708 caption delivery system, and an EIA 608 caption service menu is displayed when the delivery system is the EIA 608 caption delivery system. The EIA 708 caption service menu is displayed when the delivery system is both the EIA 708 caption delivery system and the EIA 608 caption delivery system. One of the EIA 708 caption service menu and the EIA 608 caption service menu may be selected and displayed when the delivery system is both the EIA 708 caption delivery system and the EIA 608 caption delivery system.

BRIEF DESCRIPTION OF THE DRAWING FIGURES

These and/or other aspects and advantages of the invention will become apparent and more readily appreciated from the following description of exemplary embodiments, taken in conjunction with the accompanying drawing figures of which:

DETAILED DESCRIPTION OF EXEMPLARY EMBODIMENTS

Figure 1:
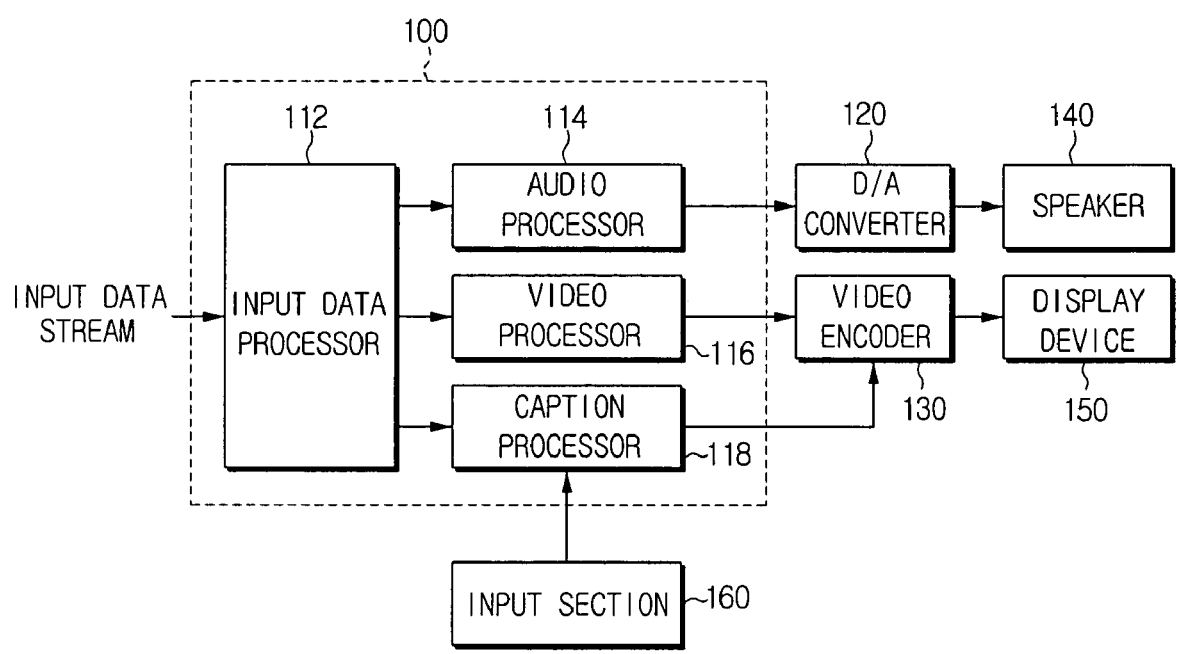
FIG. 1 is a block diagram of a caption data processing system of a digital display apparatus.

Reference will now be made in detail to exemplary embodiments of the present invention, examples of which are illustrated in the accompanying drawings, wherein like reference numerals refer to the like elements throughout. The exemplary embodiments are described below to explain the present invention by referring to the figures.

FIG. 1 is a schematic block diagram of a caption data processing system of a digital display apparatus. A caption service system includes a microcomputer or decoder (hereinafter, referred to as a decoder) 100, a digital-to-analog (DA) converter 120, a video encoder 130, a speaker 140, a display device 150, and an input section 160.

The decoder 100 includes an input data processor 112, an audio processor 114, a video processor 116, and a caption processor 118. The input data processor 112 receives a data stream from outside, and separates and outputs video information, audio information, and caption information from the data stream. The audio processor 114 receives the audio information from the input data processor 112 and signal-processes the received audio information to be output through the speaker 140. The video processor 116 receives the video information from the input data processor 112 and signal-processes the received video information to be displayable on the display device 150. Typically, the video processor 116 reconstructs the video from compressed data and transfers a video signal compliant with an international standard to the video encoder 130.

When a user selects a caption mode through the input section 160, the caption processor 118 decodes the caption information provided from the input data processor 112 according to a standard. The decoded caption information is combined with the video signal converted at the video encoder 130 to be output to the display device 150. Generally, the caption processor 118 includes a receiver for receiving the caption data from the input data processor 112, a module for parsing the received caption data, and a display module for drawing the caption, which are not described for brevity.

Figure 2A:
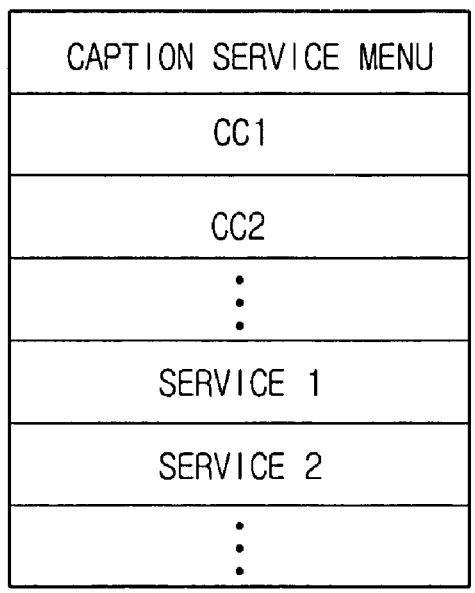
FIG. 2A is a caption service menu.
Figure 2B:
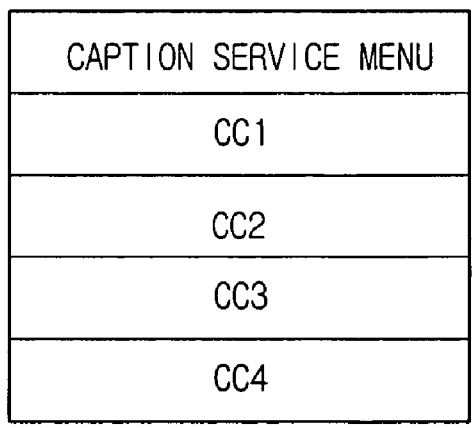
FIG. 2B is another caption service menu.

The caption processor 118 controls display of a caption service menu that is classified according to a data format carried in a user data region of a Moving Picture Experts Group (MPEG) picture of a digital stream. To be specific, the caption service menu is classified and displayed by extracting a factor from a flag of the received user data for discriminating an Electronic Industries Association (EIA) 708 caption and an EIA 608 caption. For example, even a digital channel for cable broadcasting and satellite broadcasting carries the EIA 608 caption and the EIA 708 caption. The EIA 608 caption of the cable broadcasting is specified in DVS 157, and the DIRECTV for satellite broadcasting specifies DTVMDB04_MPEG2BSv2_1. To process the different caption data such as the EIA 708 caption and the EIA 608 caption in the digital broadcasting environment, logic algorithms to embody the caption should be configured differently from each other. When the EIA 608 caption is received, the caption processor 118 controls to display the caption service menu for the EIA 608 CC1, CC2, CC3, and CC4 as shown in FIG. 2B. Upon receiving the EIA 708 caption, the EIA 708 caption menu CC1, CC2, CC3, CC4, Service 1, . . . , Service 6 is displayed as shown in FIG. 2A. As for the digital channel without the caption, the EIA 608 caption menu is displayed.

For example, the caption processor 118 reads a code "00 00 01 B2" in the user data and determines the presence of the caption service. Upon receiving a code "0X47, 0X41, 0X39, 0X34" in the user data, the caption processor 118 reads as ATSC ID and controls to display the EIA 708 caption service menu. If the input code is "0X03", the caption processor 118 reads as EIA 608 caption ID and controls to display the EIA 608 caption service menu.

The caption service menu is displayed based on the analysis of the caption information that is input every channel change made by the user.

The video encoder 130 converts RGB information to an NTSC analog signal to be received by the display device 150 and outputs the NTSC analog signal. In addition, the video encoder 130 combines the caption information received from the caption processor 118 with the video signal for display on the display device 150.

The DA converter 120 converts the digital signal output from the audio processor 114, to an analog signal and outputs the analog signal to the speaker 140.

Figure 3:
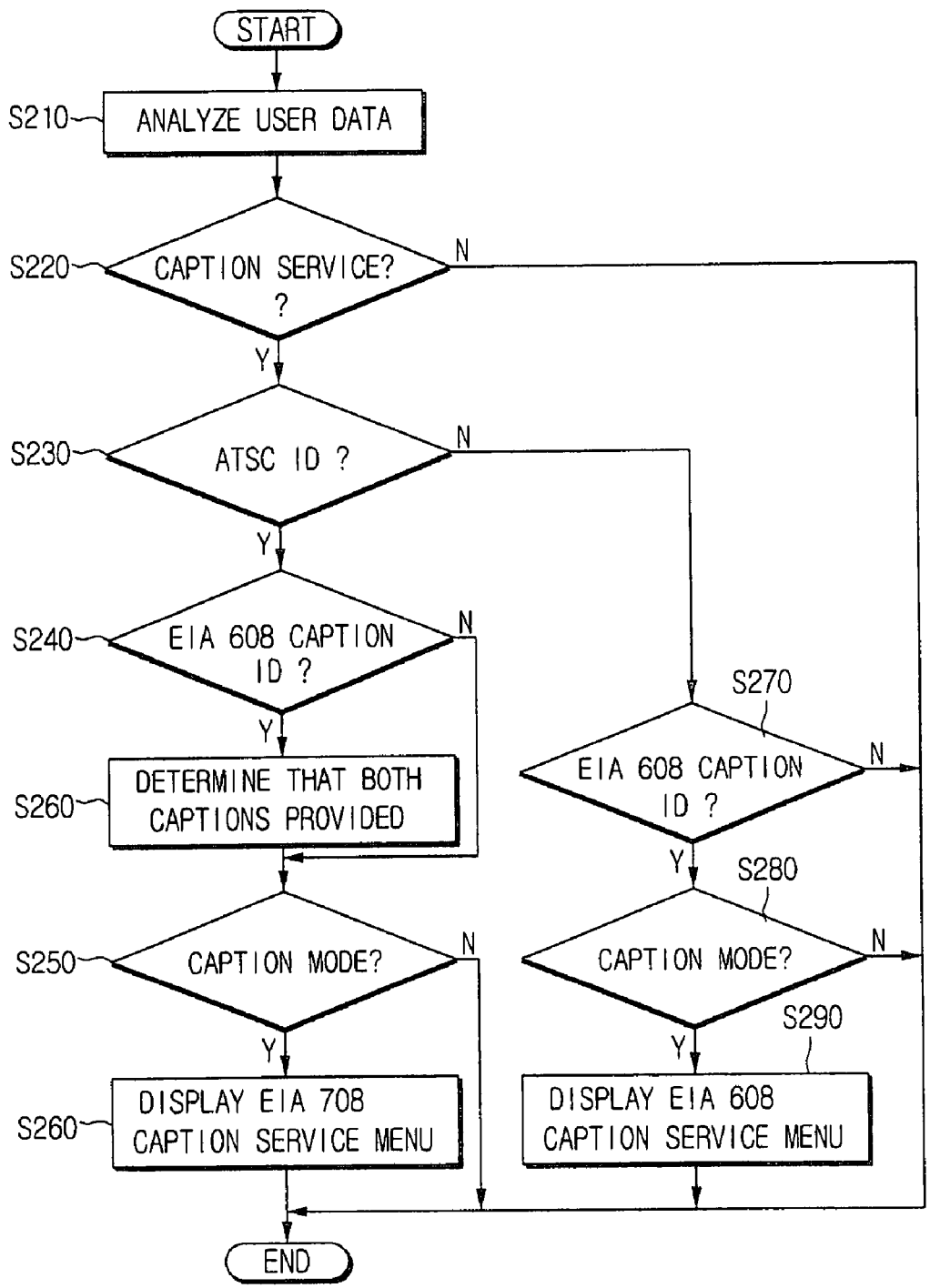
FIG. 3 is a flowchart explaining operations for displaying the caption service menu according to an exemplary embodiment of the present invention.

The following provides descriptions relating to a method for displaying the caption service menu according to an embodiment of the present invention. FIG. 3 is a flowchart explaining how the caption service menu is displayed. The caption processor 118 of the decoder 100 analyzes the user data of the MPEG picture of the digital stream fed from the input data processor 112 (S210). The caption processor 118 determines whether the caption data is delivered (S220). If the code "00 00 01 B2" is read from the user data, the caption processor 118 determines that the caption service is provided.

When the delivery of the caption service is determined at operation S220, the caption processor 118 determines whether the ATSC ID is present in the user data (S230). The presence of the ATSC ID is determined if the code "0X47, 0X41, 0X39, 0X34" is in the user data. Upon reading the ATSC ID at operation S230, it is determined whether the EIA 608 caption ID is input (S240). The EIA 608 caption ID is read from the input code "0X03" in the user data. The read EIA 608 caption ID denotes that the EIA 708 caption and the EIA 608 caption are provided at the same time. When the user selects the caption mode through the input section 160 (S250), the caption processor 118 displays the EIA 708 caption service menu (S260).

Upon determining the absence of the ATSC ID at operation S230, it is determined whether the EIA 608 caption ID is input (S270). When the EIA 608 caption is input, the caption processor 118 determines that the EIA 608 caption is provided. Meanwhile, when the caption mode is selected through the input section 160 (S280), the caption processor 118 displays the EIA 608 caption service menu (S290).

As set forth above, when both or one of the EIA 708 caption and the EIA 608 caption is or are provided through digital broadcasting(S245), proper caption service menu can be displayed(S260).

In the exemplary embodiment of the present invention, it has been described that the EIA 708 caption service menu is displayed at operation S260 when the EIA 708 caption and the EIA 608 caption are input at the same time, but the invention is not limited to this menu. It is possible to allow the user to select one of the EIA 708 caption and the EIA 608 caption service menus and to display the selected service menu upon receiving both of the EIA 708 caption and the EIA 608 caption.

It is preferable, but not necessary, that the caption service menu is displayed repeatedly every channel change from operation S210 to operation S290, and that a relevant caption service menu is displayed immediately when the channel is changed with the caption service menu displayed. The present invention is applicable to a digital set-top box as well as the display device such as a digital TV.

Although a few embodiments of the present invention have been shown and described, it will be appreciated by those skilled in the art that changes may be made in these embodiments without departing from the principles and spirit of the invention, the scope of which is defined in the claims and their equivalents.

In light of the foregoing as mentioned above, the user can view the caption service menu depending on the caption information of the current broadcasting without having to select an unavailable service. Even when the delivery system of the caption may vary according to transmission media such as ground wave, cable, and satellite, the user can view and conveniently use the same caption service menu.

What is claimed is:

1. A method for displaying a caption service menu, the method comprising:
   receiving a user input to display the caption service menu;
   determining which of a first type caption delivery system and a second type caption delivery system is adopted for a currently received channel; and
   displaying, as the caption service menu, a caption service menu corresponding to the first type caption delivery system if it is determined that the first type caption delivery system is adopted, and displaying, as the caption service menu, a caption service menu corresponding to the second type caption delivery system if it is determined that the second type caption delivery system is adopted,
   wherein the first type caption delivery system and the second type caption delivery system represent different formats of data.

2. A method for displaying a caption service menu, the method comprising:
   receiving a user input to display the caption service menu;
   determining which of a first type caption delivery system and a second type caption delivery system is adopted for a currently received channel; and
   displaying, as the caption service menu, a caption service menu corresponding to the first type caption delivery system if it is determined that the first type caption delivery system is adopted, and displaying, as the caption service menu, a caption service menu corresponding to the second type caption delivery system if it is determined that the second type caption delivery system is adopted,
   wherein the first type caption delivery system and the second type caption delivery system are determined according to the different formats of data carried in a user data region of a Moving Picture Experts Group (MPEG) picture of a digital stream.

3. A method for displaying a caption service menu, the method comprising:
   receiving a user input to display the caption service menu;
   determining which of a first type caption delivery system and a second type caption delivery system is adopted for a currently received channel; and
   displaying, as the caption service menu, a caption service menu corresponding to the first type caption delivery system if it is determined that the first type caption delivery system is adopted, and displaying, as the caption service menu, a caption service menu corresponding to the second type caption delivery system if it is determined that the second type caption delivery system is adopted,
   wherein the first type caption delivery system is an Electronic Industries Association (EIA) 708 caption delivery system and the second type caption delivery system is an EIA 608 caption delivery system.

4. The method according to claim 3, wherein an EIA 708 caption service menu is displayed when the delivery system is the first type caption delivery system, and an EIA 608 caption service menu is displayed when the delivery system is the second type caption delivery system.

5. The method according to claim 4, wherein the EIA 708 caption service menu is displayed when the delivery system is both the EIA 708 caption delivery system and the EIA 608 caption delivery system.

6. The method according to claim 4, wherein one of the EIA 708 caption service menu and the EIA 608 caption service menu is selected when the delivery system is both the EIA 708 caption delivery system and the EIA 608 caption delivery system.

7. A caption service menu display apparatus comprising:
   an input unit configured to receive a user input to display a caption service menu; and
   a caption processor configured to determine which of a first type caption delivery system and a second type caption delivery system is adopted for a currently received channel, to display, as the caption service menu, a caption service menu corresponding to the first type caption delivery system if it is determined that the first type caption delivery system is adopted, and to display, as the caption service menu, a caption service menu corresponding to the second type caption delivery system if it is determined that the second type caption delivery system is adopted,
   wherein the first type caption delivery system and the second type caption delivery system represent different formats of data.

8. A caption service menu display apparatus comprising:
   an input unit configured to receive a user input to display a caption service menu; and
   a caption processor configured to determine which of a first type caption delivery system and a second type caption delivery system is adopted for a currently received channel, to display, as the caption service menu, a caption service menu corresponding to the first type caption delivery system if it is determined that the first type caption delivery system is adopted, and to display, as the caption service menu, a caption service menu corresponding to the second type caption delivery system if it is determined that the second type caption delivery system is adopted,
   wherein the first caption delivery system and second caption delivery system are determined according to a format of data carried in a user data region of a Moving Picture Experts Group (MPEG) picture of a digital stream.

9. A caption service menu display apparatus comprising:
   an input unit configured to receive a user input to display a caption service menu; and
   a caption processor configured to determine which of a first type caption delivery system and a second type caption delivery system is adopted for a currently received channel, to display, as the caption service menu, a caption service menu corresponding to the first type caption delivery system if it is determined that the first type caption delivery system is adopted, and to display, as the caption service menu, a caption service menu corresponding to the second type caption delivery system if it is determined that the second type caption delivery system is adopted, wherein the first type caption delivery system is an Electronic Industries Association (EIA) 708 caption delivery system and the second type caption delivery system is an EIA 608 caption delivery system.

10. The caption service menu display apparatus according to claim 9, wherein an EIA 708 caption service menu is displayed when the delivery system is the first type caption delivery system, and an EIA 608 caption service menu is displayed when the delivery system is the second type caption delivery system.

11. The caption service menu display apparatus according to claim 10, wherein the EIA 708 caption service menu is displayed when the delivery system is both the EIA 708 caption delivery system and the EIA 608 caption delivery system.

12. The caption service menu display apparatus according to claim 10, wherein one of the EIA 708 caption service menu and the EIA 608 caption service menu is selected and displayed when the delivery system is both the EIA 708 caption delivery system and the EIA 608 caption delivery system.

13. A caption service menu display apparatus of a digital receiver, comprising:
a caption processor configured to process and output a caption information delivery system and caption information in a user data region of a Moving Picture Experts Group (MPEG) picture of a digital stream of a received channel;
an input section configured to select a caption mode; and
a decoder configured to control display of the different caption service menu according to the caption information delivery system that is output from the caption processor when the caption mode is selected though the input section,
wherein a first type caption delivery system is an Electronic Industries Association (EIA) 708 caption delivery system and a second type caption delivery system is an EIA 608 caption delivery system and wherein an EIA 708 caption service menu is displayed when the delivery system is the first type caption delivery system. and an EIA 608 caption service menu is displayed when the delivery system is the second type caption delivery system.

14. The caption service menu display apparatus according to claim 13, wherein the EIA 708 caption service menu is displayed when the delivery system is both the EIA 708 caption delivery system and the EIA 608 caption delivery system.

15. The caption service menu display apparatus according to claim 13, wherein one of the EIA 708 caption service menu and the EIA 608 caption service menu is selected through the input section and displayed when the delivery system is both the EIA 708 caption delivery system and the EIA 608 caption delivery system.

16. A method for displaying caption service menu comprising:
determining whether a caption service is provided;
determining whether a first type of caption system data and/or a second type of caption system data is included in the caption service; and
displaying different caption service menus depending upon the selection of the first type of caption system data and/or the second type of caption system data,
wherein the different caption service menus are automatically displayed after a channel change in a television broadcast.

17. The method in accordance with claim 16, wherein the caption service is included in a digital television broadcast.

18. The method in accordance with claim 17, wherein the first type of caption system is in accordance with the EIA 708 caption system.

19. The method in accordance with claim 18, wherein the second type of caption system is in accordance with the EIA 608 caption system.

20. The method in accordance with claim 19, wherein the user selects either one of the first type of caption system data or the second type of caption system data.

21. The method in accordance with claim 16, wherein when only one of the first type of caption system data or the second type of caption system data is included in the caption service, the corresponding caption service menu is displayed.

22. The method in accordance with claim 16, wherein different caption service menus are displayed when a user selects a caption display mode.

23. The method in accordance with claim 16, wherein the number of menu items are different for the different caption service menus.

24. A method for displaying a caption service menu comprising:
displaying a different caption service menu according to a caption delivery system of a received channel,
wherein a first type caption service menu is displayed when the caption delivery system is both a first type caption delivery system and a second type caption delivery system, and wherein the first type caption delivery system and the second type caption delivery system represent different formats of data.

25. A caption service menu display apparatus comprising:
a caption processor configured to output caption information to display a different caption service menu according to a caption delivery system of a received channel,
wherein a first type caption service menu is displayed when the caption delivery system is both a first type caption delivery system and a second type caption delivery system, and wherein the first type caption delivery system and the second type caption delivery system represent different formats of data.

* * * * *